E. FIRNHABER.
ANIMAL TRAP.
APPLICATION FILED JUNE 28, 1911.
1,010,486.
Patented Dec. 5, 1911.
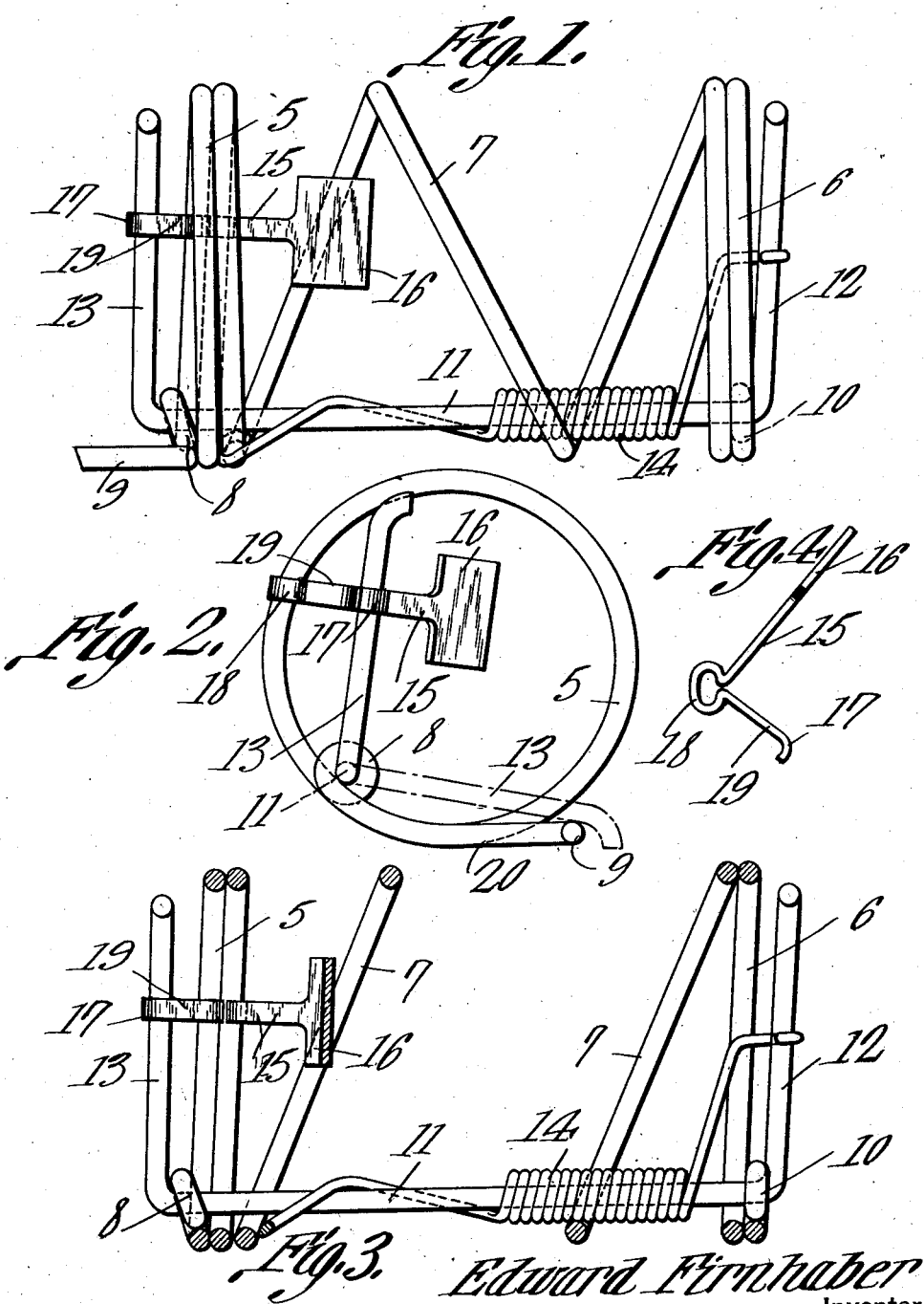
Witnesses
Edward Firnhaber
Inventor
by C. A. Snow & Co.
Attorneys

UNITED STATES PATENT OFFICE.

EDWARD FIRNHABER, OF JANESVILLE, MINNESOTA.

ANIMAL-TRAP.

1,010,486.   Specification of Letters Patent.   Patented Dec. 5, 1911.

Application filed June 28, 1911. Serial No. 635,869.

*To all whom it may concern:*

Be it known that I, EDWARD FIRNHABER, a citizen of the United States, residing at Janesville, in the county of Waseca and State of Minnesota, have invented a new and useful Animal-Trap, of which the following is a specification.

This invention relates to animal traps, and has for its object to provide a new and improved animal trap which is simple and durable in construction, efficient in use, and particularly designed for catching gophers, moles, rats and other animals burrowing in the ground.

This invention is embodied in a novel arrangement, construction and combination of parts as hereinafter described and claimed, it being understood that the invention is capable of alteration in its details of construction within the scope of the appended claims without departing from the spirit of the invention.

The invention is illustrated in the accompanying drawings, in which similar reference characters indicate similar parts, and in which;—

Figure 1 is a side elevation of the preferred form of trap, in "set" position; Fig. 2 is an end view of the same; Fig. 3 is a longitudinal vertical section thereof; and Fig. 4 is a plan view in detail of the detent of the trigger.

Referring specifically to the drawings, the skeleton or frame of the trap is shown as comprising a single length of wire bent to form circling end members or rings 5 and 6, which are connected by a spiral portion 7, forming a substantially cylindrical-shaped body. From the extreme end of the said wire at the end 6 is bent at one side of the bottom thereof the eye 10, and from the other end of the wire is bent the eye 8 which is in alinement with the eye 10. From the eye 8 this end of the wire is bent tangentially as shown at 20 and then outwardly or angularly to form a longitudinally-projecting finger or stop 9.

A wire shaft 11 is pivoted between the eyes 8 and 10 and has the outer ends thereof bent at right angles thereto as shown at 12 and 13, the said arms 12 and 13 being adjacent the respective ends 6 and 5 of the frame.

A coiled spring 14 is mounted on the shaft 11 and has one end thereof rigidly secured to the end 5 of the frame and the other end thereof attached to the arm 12 which is at the rear end of the frame, the said spring tending to depress or swing the arm 13 downward to the position shown in broken lines in Fig. 2.

A trigger or detent is pivoted on the front end 5 of the frame above the eye 8 and comprises a piece of metal bent to form an outer arm 19 and an inner arm 15, the portion between the said arms being looped as shown at 18 to pass around the end 5, and the respective free ends of the arms 19 and 15 bearing a hook 17 and a target 16.

To set the trap, the arm 13 is raised or swung against the tension of the spring 14 and the hook 17 of the trigger is engaged therewith, the target 16 being thus projected into the frame to lie in the path of any animal passing therethrough. The trap is then inserted into the burrow or hole through which the animal to be trapped is expected to pass, the front end thereof being disposed toward the direction from which the animal is expected to come. The animal being required to pass through the cylindrical frame of the trap strikes the target 16 and thus swings the hook 17 to release the arm 13. This arm 13 being released swings downward by force of the spring 14 and clenches the animal between it and the bottom of the frame, thus strangling the animal.

Having described my invention what I claim as new is:—

1. An animal trap comprising a cylindrical frame bent from a length of wire to form end rings having alining eyes in one side of same, and a spiral portion connecting the said rings; a shaft passing through the said eyes and having arms at the outer ends thereof; a spring secured between the frame and one of said arms; and a trigger mounted on the said frame and adapted to engage the other arm and to release the same when an animal passes through the frame.

2. An animal trap comprising a cylindrical frame bent from a length of wire to form end rings and a spiral portion connecting the said rings; a shaft pivoted to one side of the frame and having a pair of projecting arms; a spring secured between the frame and one of said arms; and a trigger mounted on the said frame and adapted to engage the other arm and to release the same when an animal passes through the frame.

In testimony that I claim the foregoing as my own, I have hereto affixed my signature in the presence of two witnesses.

EDWARD FIRNHABER.

Witnesses:
  E. DIEUDONNE,
  F. B. VOLZ.

Copies of this patent may be obtained for five cents each, by addressing the "Commissioner of Patents, Washington, D. C."